United States Patent
Wang

(10) Patent No.: US 8,913,953 B2
(45) Date of Patent: Dec. 16, 2014

(54) METHOD FOR CHANGING OPERATING MODE OF ELECTRONIC DEVICE WHEN HUMAN PRESENCE IS DETECTED AND ELECTRONIC DEVICE USING THE METHOD

(75) Inventor: Cheng-Wen Wang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 640 days.

(21) Appl. No.: 13/190,489

(22) Filed: Jul. 26, 2011

(65) Prior Publication Data
US 2012/0052804 A1    Mar. 1, 2012

Related U.S. Application Data

(60) Provisional application No. 61/377,471, filed on Aug. 27, 2010.

(51) Int. Cl.
*H04B 5/00* (2006.01)
*H04W 52/28* (2009.01)
*H04B 1/38* (2006.01)

(52) U.S. Cl.
CPC ........... *H04W 52/283* (2013.01); *H04B 1/3838* (2013.01)
USPC ... 455/41.1; 455/41.2; 455/552.1; 455/575.4; 455/115.1; 343/702

(58) Field of Classification Search
CPC ... H04W 52/283; H04W 4/008; H04W 88/02; H04M 1/7253; H04M 2250/04; H04M 2250/12
USPC .......... 455/41.1, 41.2, 550.1, 552.1, 41.3, 73, 455/575.4, 566, 115.1; 343/702
See application file for complete search history.

(56) References Cited

U.S. PATENT DOCUMENTS 5,956,626 A * 9/1999 Kaschke et al. ............ 455/115.1
2009/0305742 A1* 12/2009 Caballero et al. ............. 455/566

FOREIGN PATENT DOCUMENTS

WO    2009149023 A1    12/2009

* cited by examiner

*Primary Examiner* — Shaima Q Aminzay
(74) *Attorney, Agent, or Firm* — CKC & Partners Co., Ltd.

(57) ABSTRACT

A method for controlling a function is used for an electronic device. The electronic device includes a first sensor and a second sensor. In the method for controlling the function, a first determination result is generated by determining if a neighboring object neighboring to the electronic device belongs to a target species with assist of the first sensor. A second determination result is generated by determining if the neighboring object belongs to an exception species with assist of the second sensor. The function executed by the electronic device is adjusted according to the first determination result and the second determination result.

13 Claims, 3 Drawing Sheets

METHOD FOR CHANGING OPERATING MODE OF ELECTRONIC DEVICE WHEN HUMAN PRESENCE IS DETECTED AND ELECTRONIC DEVICE USING THE METHOD

RELATED APPLICATIONS

This application claims priority to U.S. provisional Application Ser. No. 61/377,471, filed Aug. 27, 2010, which is herein incorporated by reference.

BACKGROUND

1. Technical Field

The present invention relates to a method for controlling a function and an electronic device applying thereof.

2. Description of Related Art

Communication technology has advances considerably. As a result, many communication applications have been developed, such as those related to short message service (SMS), multimedia message service (MMS), instant messaging (IM), email, voice calling, video calling, phonebooks etc. Many different electronic devices have also been developed to provide these communication applications. Such electronic devices include personal computers (PCs), laptops, mobile phones, personal digital assistants (PDAs), smart phones, tablet PCs, information appliances, etc.

To enable transmission of data without being limited by the lengths of transmission wires, many wireless data transmission interfaces have also been developed and adopted by many electronic devices. For example, popular wireless data transmission interfaces include Bluetooth, Infrared Data (IrDA) Association, IEEE 802.11 series, WiFi, Zigbee, etc.

While utilizing wireless electronic devices to transmit data provides for convenience, the electromagnetic waves generated by wireless data transmission may threaten our health. There is a need to avoid the threats to our health associated with wireless data transmission, while at the same time providing good data transmission quality at the same time.

SUMMARY

According to one embodiment of this invention, a method for controlling a function of an electronic device is provided. In the method for controlling a function of an electronic device, a sensor of an electronic device is utilized to determine if a neighboring object neighboring to the electronic device belongs to a target species, another sensor of the electronic device is utilized to determine if the neighboring object belongs to an exception species, and the function executed by the electronic device is adjusted according to the determination results. The method for controlling a function of an electronic device may take the form of a computer program product stored on a computer-readable storage medium having computer-readable instructions embodied in the medium, such that a computer executes the method for controlling the function after reading the computer-readable storage medium. The electronic device includes a first sensor and a second sensor. In the method for controlling the function, determine if a neighboring object neighboring to the electronic device belongs to a target species with assist of/by the first sensor to generate a first determination result. Then, determine if the neighboring object belongs to an exception species with assist of/by the second sensor to generate a second determination result. Finally, the function executed by the electronic device is adjusted according to the first determination result and the second determination result.

According to another embodiment of this invention, an electronic device is provided. The electronic device drives a sensor to determine if a neighboring object neighboring to the electronic device belongs to a target species, and then drives another sensor to determine if the neighboring object belongs to an exception species, and finally adjusts the executed function according to the determination results. The electronic device includes a first sensor, a second sensor and a control unit. The control unit is electrically connected to the first sensor and the second sensor. The control unit determines if a neighboring object neighboring to the electronic device belongs to a target species with assist of/by the first sensor to generate a first determination result. The control unit also determines if the neighboring object belongs to an exception species with assist of/by the second sensor to generate a second determination result. The control unit then adjusts a function executed by the electronic device according to the first determination result and the second determination result.

The present invention can achieve many advantages. The function executed by the electronic device can be adjusted as the neighboring object differs. Moreover, a second sensor is used to avoid the situation in which objects, which do not belong to the target species, are determined erroneously with assist of/by a first sensor. If the target species is preset to a human being, the electronic device utilizes the lower data transmission power to transmit data wirelessly. Hence, the harmful effects of the electromagnetic waves on human health caused by high wireless transmission power may be avoided.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
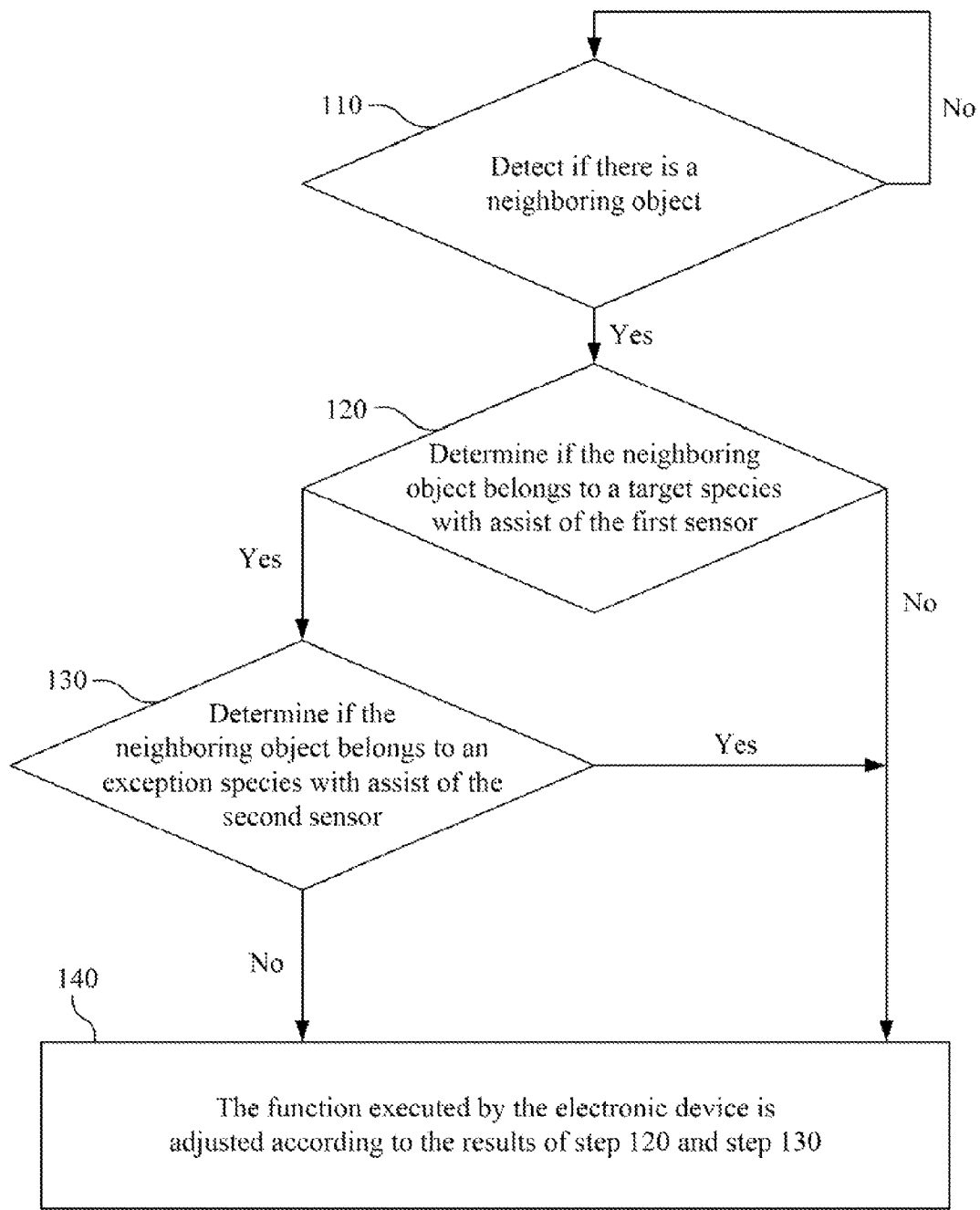
FIG. 1 is a flow diagram of a method for controlling a function of an electronic device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a flow diagram of a method for controlling a function of an electronic device according to one embodiment of this invention. In the method for controlling a function of an electronic device, a sensor of the electronic device is utilized to determine if a neighboring object neighboring to the electronic device belongs to a target species, and another sensor of the electronic device is utilized to determine if the neighboring object belongs to an exception species, and the function executed by the electronic device is adjusted according to the determination results. The method for controlling the function may take the form of a computer program product stored on a computer-readable storage medium having computer-readable instructions embodied in the medium, such that a computer executes the method for controlling the function after reading the computer-readable storage medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives and floppy disk drives.

The method 100 for controlling the function includes the steps as outlined below. In step 120, determine if a neighboring object neighboring to the electronic device belongs to a target species with assist of/by the first sensor to generate a first determination result. Wherein, before step 120, the method 100 for controlling the function may include a step of detecting if there is a neighboring object neighboring/close/in proximity to the electronic device (step 110). In one embodiment of this invention, a proximity sensor may be utilized for detecting if there is a neighboring object neighboring to the electronic device (step 110). When a neighboring object neighboring to the electronic device is detected in step 110, the same sensor utilized in step 110 may be used as the first sensor for determination in step 120. In other embodiments, different sensors may be utilized in step 110 and step 120. Then, when there is a neighboring object detected neighboring to the electronic device, determination of step 120 is executed. When there is no neighboring object neighboring to the electronic device, the step of detecting if there is a neighboring object neighboring to the electronic device (step 110) may be repeated.

When the determination result of step 120 indicates that the neighboring object belongs to the target species, determine if the neighboring object belongs to an exception species with assist of/by the second sensor to generate a second determination result (step 130). Wherein, the target species and the exception species are different.

Hence, in step 140, the function executed by the electronic device is adjusted according to the determination results of step 120 and step 130. Wherein, the adjusted function may be a transmission power of the electronic device or any other function that may be affected by or should be adjusted with different neighboring objects. Therefore, the function executed by the electronic device can be adjusted as the neighboring object differs. Moreover, a second sensor is used to avoid the situation in which objects, which do not belong to the target species, are determined erroneously with assist of/by a first sensor.

Figure 2:
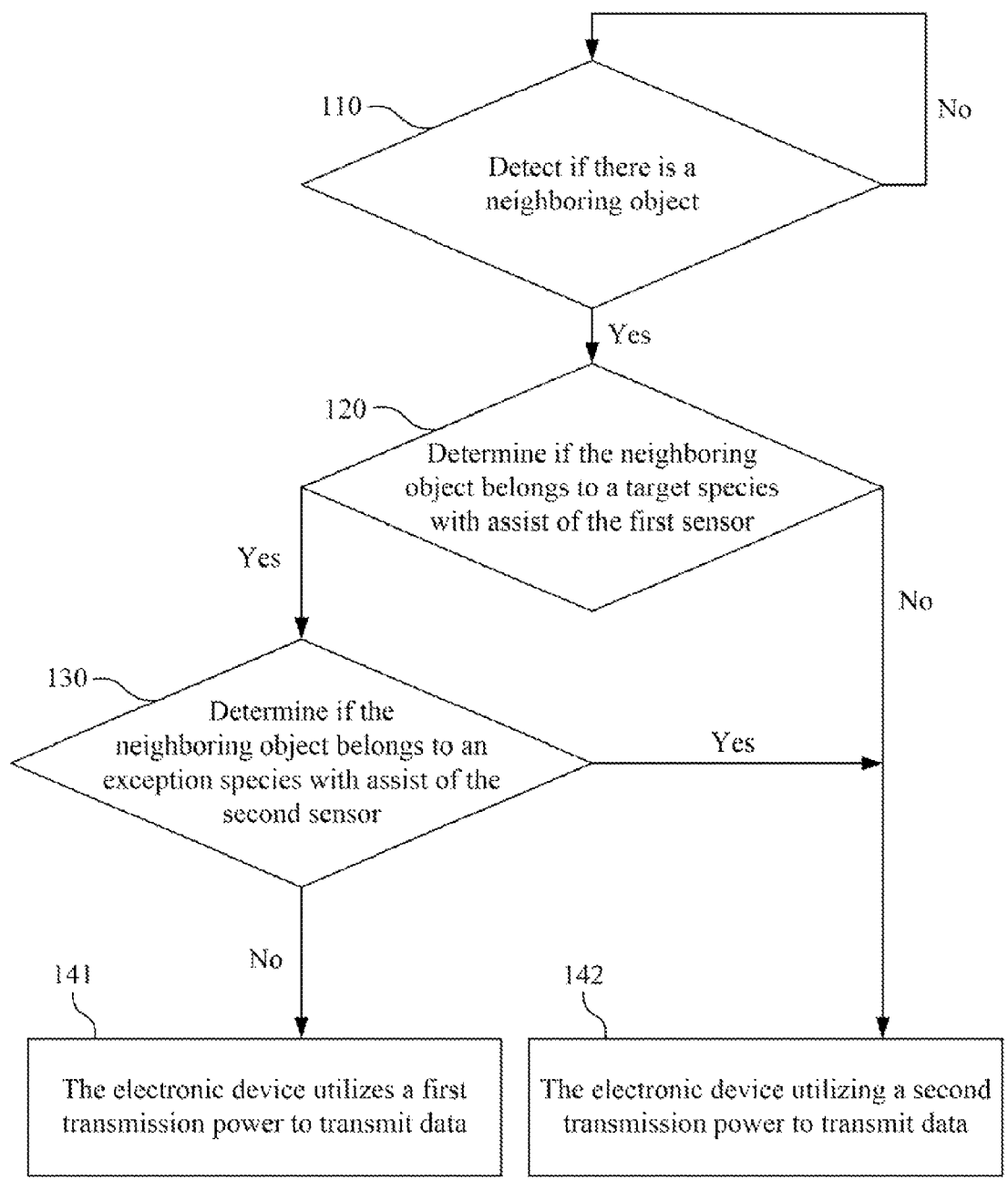
FIG. 2 is an embodiment of the method 100 for controlling the function in FIG. 1.

FIG. 2 is an embodiment of the method 100 for controlling the function in FIG. 1. It is to be understood that similar contents may not be repeated.

In one embodiment of the method 100 for controlling the function, different transmission power is utilized to transmit data as the neighboring object differs. Hence, when the determination result of step 120 indicates that the neighboring object does not belong to the target species, the electronic device utilizes a second transmission power to transmit data (step 142). When the determination result of step 120 indicates that neighboring object does belong to the target species, further determine if the neighboring object belongs to an exception species with assist of/by the second sensor to generate a second determination result (step 130).

In step 141, when the determination result of step 130 indicates that the neighboring object does not belong to the exception species, the electronic device utilizes a first transmission power to transmit data. When the determination result of step 130 indicates that the neighboring object belongs to the exception species, the electronic device utilizes the second transmission power to transmit data (step 142). Wherein, wireless data transmission technologies can be utilized for data transmission executed in step 141 and step 142. The wireless data transmission technologies may include IEEE 802.11 series, WiFi, Zigbee, second-generation wireless telephone technology (2G), third-generation wireless telephone technology (3G), Worldwide Interoperability for Microwave Access (WiMAX), Beyond 3G (B3G), Long Term Evolution (LTE) or any other wireless data transmission technology. Therefore, the electronic device can utilize different transmission powers to transmit data depending on whether the neighboring object belongs to the target species or not. In addition, if the target species is preset to be human being and the data transmission executed in step 141 and step 142 is wireless, the first transmission power is set to a value smaller than that of the second data transmission power. Hence, if there is a person neighboring the electronic device, the electronic device utilizes the lower data transmission power to transmit data wirelessly, which can reduce the electromagnetic-wave effect to the human body caused by high wireless transmission power. In addition, data transmission in step 141 and step 142 can be executed through a same data transmission protocol, which can avoid the delay caused by switching between different protocols. Besides, data transmission in step 141 and step 142 can be done utilizing a same antenna of the electronic device. Therefore, the delay caused by switching between different antennas can be avoided.

In one embodiment of this invention, the first sensor may be a dielectric sensor, such as a capacitive proximity sensor or any other type of dielectric sensor. Hence, the step of determining if the neighboring object belongs to the target species (step 120) may include the following steps: detect if a dielectric value of the neighboring object is within a preset dielectric value range utilizing the dielectric sensor. When the dielectric value of the neighboring object is within the preset dielectric value range, the determination result of step 120 indicates that the neighboring object belongs to the target species. When the target species is preset to human being, the preset dielectric value range is set to 50-58, whereas the preset dielectric value range is set to 52-56 in a better embodiment. Hence, when the dielectric value of the neighboring object is within 50-58, it is determined that the neighboring object is human being (target species). In other embodiments, the preset dielectric value range can be set to different ranges as the target species differs, which should not be limited in this disclosure.

However, the dielectric value of metal is similar to that of human beings. Hence, a metal detector can be utilized as the second sensor, and the exception species can be set to metal to prevent metal objects from being mis-determined as human being. The metal detector may be an e-compass, a magnetic sensor or any other metal detector. Thus, the exception species determination in step 130 can be executed by determining if the neighboring object is metal. Hence, the metal neighboring object would not be determined as human being despite having a similar dielectric value. In other words, since the electronic device does not transmit data with lower transmission power when neighboring to metal objects, metal objects will not affect the data transmission efficiency and quality of the electronic device.

In other embodiments of this invention, the target species determination in step 120 and the exception determination in step 130 may be executed in a different sequence. In one embodiment of this invention, the step of determining if the neighboring object belongs to the exception species may be executed prior to the step of determining if the neighboring object belongs to the target species. Wherein, when the neighboring object belongs to the target species but does not belong to the exception species, the electronic device transmits data utilizing the first transmission power. Otherwise, the electronic device transmits data utilizing the second transmission power. In another embodiment of this invention, the target species determination in step 120 and the exception determination in step 130 may be executed at the same time. Wherein, when the neighboring object belongs to the target species but does not belong to the exception species, the electronic device transmits data utilizing the first transmission power. Otherwise, the electronic device transmits data utilizing the second transmission power.

In addition, when the detection of step 110 indicates that there is no neighboring object detected neighboring to the electronic device, the electronic device transmits data utilizing the second transmission power. Therefore, since the transmission power utilized when the neighboring object does not belong to the target species or does belong to the exception species is the same as that utilized when no neighboring object is detected, the number of times for the electronic device to switch between different powers can be reduced.

Figure 3:
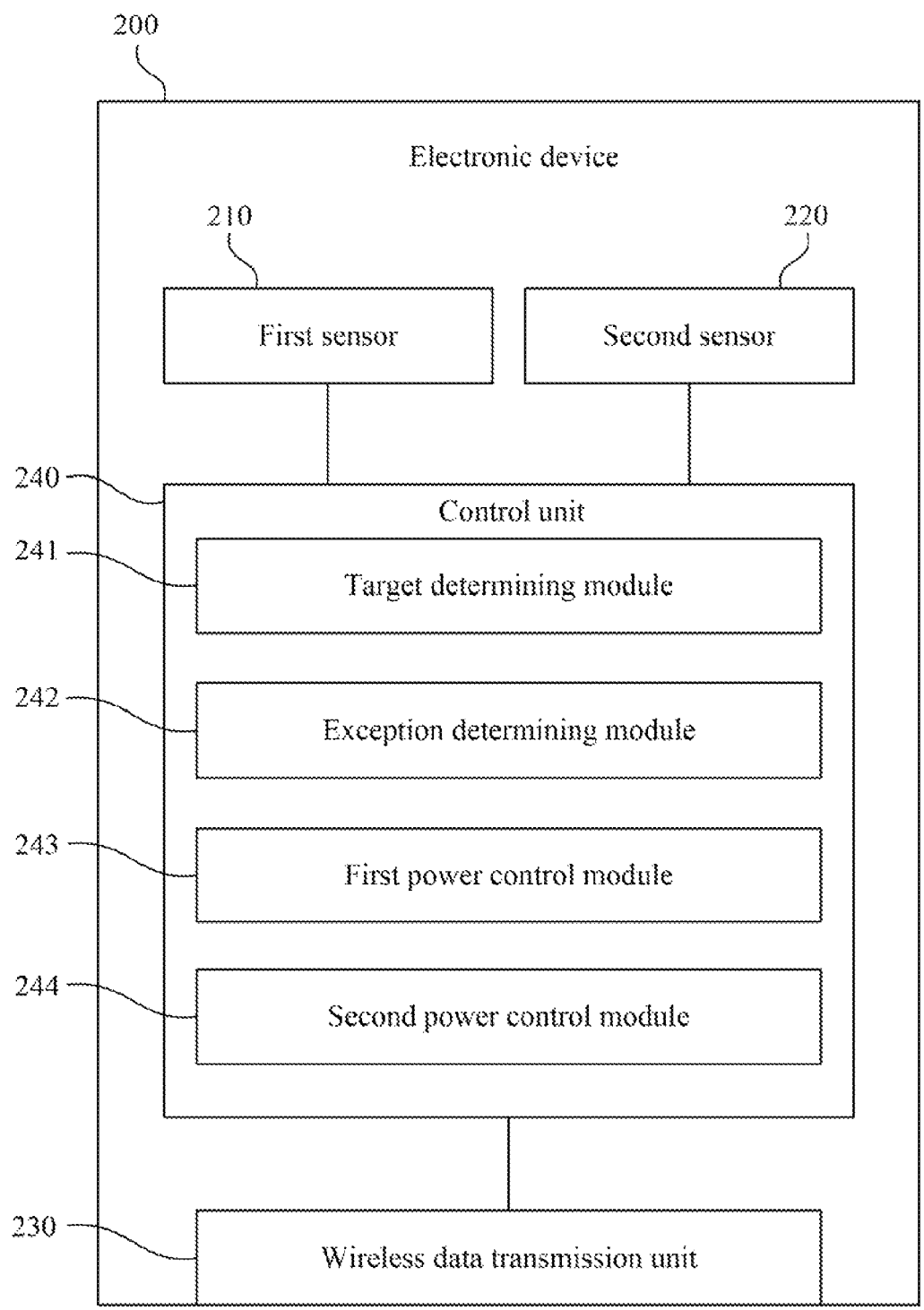
FIG. 3 is a block diagram of an electronic device according to one embodiment of this invention.

FIG. 3 is a block diagram of an electronic device according to one embodiment of this invention. The electronic device drives a sensor to determine if a neighboring object neighboring to the electronic device belongs to a target species, and drives another sensor to determine if the neighboring object belongs to an exception species, and adjusts the executed function according to the determination results.

The electronic device 200 includes a first sensor 210, a second sensor 220 and a control unit 240. The control unit 240 is electrically connected to the first sensor 210 and the second sensor 220. The control unit 240 may be a Central Processing Unit (CPU), an Embedded Controller (EC) or any other control unit.

The control unit 240 includes a target determining module 241 and an exception determining module 242. The target determining module 241 determines if a neighboring object neighboring to the electronic device 200 belongs to a target species with assist of/by the first sensor 210 to generate a first determination result. The exception determining module 242 determines if the neighboring object belongs to an exception species with assist of/by the second sensor to generate a second determination result. The control unit 240 adjusts a function executed by the electronic device 200 according to the first determination result and the second determination result. The adjusted function may be a transmission power of the electronic device 200 or any other function that may be affected by or should be adjusted with different neighboring objects. Therefore, the function executed by the electronic device 200 can be adjusted as the neighboring object differs. Moreover, the second sensor 220 is used to avoid the situation in which objects, which do not belong to the target species, are determined erroneously with assist of/by the first sensor 210.

In one embodiment of this invention, the electronic device 200 may utilize different transmission powers to transmit data as the neighboring object differs. Hence, the electronic device 200 may further include a wireless data transmission unit 230, which is electrically connected to the control unit 240. The wireless data transmission unit 230 may follow IEEE 802.11 series, WiFi, Zigbee, 2G, 3G, WiMAX, B3G, LTE or any other wireless data transmission protocol to transmit data wirelessly.

The control unit 240 may further include a first power control module 243 and a second power control module 244. When the control unit 240 determines that the neighboring object belongs to the target species but does not belong to the exception species, the first power control module 243 drives the wireless data transmission unit 230 to utilize a first transmission power to transmit data. When the control unit 240 determines that the neighboring object does not belong to the target species or does belong to the exception species, the second power control module 244 drives the wireless data transmission unit 230 to utilize a second transmission power to transmit data. The first transmission power is lower than the second data transmission power. Therefore, the electronic device 200 can utilize different transmission power to transmit data depending on whether the neighboring object belongs to the target species or not. In addition, if the target species is preset as human being, the electronic device utilizes the lower data transmission power to transmit data wirelessly when neighboring to human being. As a result, the harmful effects of electromagnetic waves on human health caused by high wireless transmission power may be avoided. In addition, the first power control module 243 and the second power control module 244 drive the wireless data transmission unit 230 to transmit data through the same wireless data transmission protocol. Therefore, the delay caused by switching between different protocols can be avoided. Besides, the first power control module 243 and the second power control module 244 drive the wireless data transmission unit 230 to utilize the same antenna to transmit data. Therefore, the delay due to initializing processes for the antenna switching can be avoided.

In one embodiment of this invention, the first sensor 210 may be a dielectric sensor, such as a capacitive proximity sensor or any other type of dielectric sensor. Hence, the target determining module 241 may drive the dielectric sensor (first sensor 210) to detect if dielectric value of the neighboring object is within a preset dielectric value range. When the dielectric value of the neighboring object is within the preset dielectric value range, the target determining module 241 determines that the neighboring object belongs to the target species. When the target species is preset to human being, the preset dielectric value range is set to 50-58, whereas the preset dielectric value range is set to 52-56 in a better embodiment. Hence, when the dielectric value of the neighboring object is within 50-58, the target determining module 241 determines that the neighboring object belongs to human being (target species). In other embodiments, the preset dielectric value range can be set to different ranges as the target species differs, which should not be limited in this disclosure.

However, the dielectric value of metal is similar to that of human being. Hence, a metal detector can be utilized as the second sensor 220, and the exception species can be set to metal to prevent metal objects from being mis-determined as human being. Thus, the exception determining module 242 can drive the metal detector (second sensor 220) to determine if the neighboring object is metal (exception species). Therefore, the metal object would not be determined as human being due to their similar dielectric values. In other words, since the electronic device 200 does not transmit with lower transmission power when neighboring to metal objects, metal objects will not affect the data transmission efficiency and quality of the electronic device.

The present invention can achieve the advantages as below. The function executed by the electronic device can be adjusted as the neighboring object differs. Besides, a second sensor is further adopted to ensure that an exception object being determined as target species by a first sensor due to its property is resorted correctly. If the target species is preset to human being, the electronic device utilizes the lower data transmission power to transmit data wirelessly, which can reduce the electromagnetic-wave effect to the human body caused by high wireless transmission power.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for controlling a function of an electronic device, wherein the electronic device comprises a first sensor and a second sensor, the method for controlling the function comprises:
    determining if a neighboring object nearing to the electronic device belongs to a target species with assist of the first sensor to generate a first determination result;
    determining if the neighboring object belongs to an exception species with assist of the second sensor to generate a second determination result; and
    adjusting the function executed by the electronic device according to the first determination result and the second determination result,
    wherein the first sensor is a dielectric sensor, and the step of determining if the neighboring object belongs to the target species with assist of the first sensor comprises:
    detecting if a dielectric value of the neighboring object is within a preset dielectric value range utilizing the dielectric sensor; and
    when the dielectric value of the neighboring object is within the preset dielectric value range, determining that the neighboring object belongs to the target species.

2. The method for controlling the function of claim 1, wherein the step of adjusting the function executed by the electronic device according to the first determination result and the second determination result comprises:
    when the neighboring object belongs to the target species but does not belong to the exception species, the electronic device utilizing a first transmission power to transmit data; and
    when the neighboring object does not belong to the target species or does belong to the exception species, the electronic device utilizing a second transmission power to transmit data, wherein the first transmission power and the second transmission power are different.

3. The method for controlling the function of claim 2, wherein the first transmission power is lower than the second transmission power.

4. The method for controlling the function of claim 2, wherein the electronic device transmits data utilizing a wireless data transmission technology.

5. The method for controlling the function of claim 2, wherein the step of the electronic device utilizing the first transmission power to transmit data and the step of the electronic device utilizing the second transmission power to transmit data are executed through a same data transmission protocol.

6. The method for controlling the function of claim 2, wherein the step of the electronic device utilizing the first transmission power to transmit data and the step of the electronic device utilizing the second transmission power to transmit data are executed utilizing a same antenna of the electronic device.

7. The method for controlling the function of claim 1, wherein the target species is human being.

8. The method for controlling the function of claim 1, wherein the exception species is metal, and the second sensor is a metal detector.

9. An electronic device comprising:
    a first sensor;
    a second sensor; and
    a control unit electrically connected to the first sensor and the second sensor and configured to:
    determine if a neighboring object nearing to the electronic device belongs to a target species with assist of the first sensor to generate a first determination result,
    determine if the neighboring object belongs to an exception species with assist of the second sensor to generate a second determination result, and
    adjust a function executed by the electronic device according to the first determination result and the second determination result,
    wherein the first sensor is a dielectric sensor;
    the control unit drives the dielectric sensor to detect if a dielectric value of the neighboring object is within a present dielectric value range; and
    when the dielectric value of the neighboring object is within the preset dielectric value range, the control unit determines that the neighboring object belongs to the target species.

10. The electronic device of claim 9, wherein:
    the electronic device further comprises a wireless data transmission unit, which is electrically connected to the control unit, and
    the control unit comprises:
    a first power control module for driving the wireless data transmission unit to utilize a first transmission power to transmit data when the control unit determines that the neighboring object belongs to the target species but does not belong to the exception species; and
    a second power control module for driving the wireless data transmission unit to utilize a second transmission power to transmit data when the neighboring object does not belong to the target species or does belong to the exception species, wherein the first transmission power and the second transmission power are different.

11. The electronic device of claim 10, wherein the first power control module and the second power control module drive the wireless data transmission unit to utilize a same antenna to transmit data.

12. The electronic device of claim 10, wherein the first power control module and the second power control module drive the wireless data transmission unit to transmit data through a same wireless data transmission protocol.

13. The electronic device of claim 9, wherein:
    the second sensor is a metal detector,
    the control unit drives the metal detector to determine if the neighboring object is metal, when the neighboring object is metal, the control unit determines that the neighboring object belongs to the exception species.

* * * * *